United States Patent [19]
Curtis et al.

[11] Patent Number: 5,237,126
[45] Date of Patent: Aug. 17, 1993

[54] OPTOELECTRIC TRANSDUCER SYSTEM FOR STRINGED INSTRUMENTS

[75] Inventors: Bradley W. Curtis, Vernonia, Oreg.; Bruce L. Kennedy; Christopher R. Willcox, both of Santa Barbara, Calif.

[73] Assignee: Audio Optics, Inc., Santa Barbara, Calif.

[21] Appl. No.: 821,032

[22] Filed: Jan. 16, 1992

[51] Int. Cl.⁵ .................... G01V 9/04; G10H 3/18
[52] U.S. Cl. ........................... 84/724; 84/731; 84/DIG. 24; 250/222.1; 250/561
[58] Field of Search ............... 84/724, 731, DIG. 24; 250/222.1, 561

[56] References Cited
U.S. PATENT DOCUMENTS

| | | | |
|---|---|---|---|
| 4,688,460 | 8/1987 | McCoy | 84/724 |
| 4,730,530 | 3/1988 | Bonanno | 84/724 |
| 5,012,086 | 4/1991 | Barnard | 84/724 X |

Primary Examiner—Stanley J. Witkowski

[57] ABSTRACT

A pick-up apparatus for a string instrument comprising an array of supports for positioning an array of detectors, each of which monitors strings' vibrations and generates electrical signals, each of the supports straddling a string of the stringed instrument. The detectors include a sensor mount, a divergent light source, and first and second optical sensors which receive light simultaneously when the light source is illuminated and generates an electrical analog output signal.

29 Claims, 14 Drawing Sheets

OPTOELECTRIC TRANSDUCER SYSTEM FOR STRINGED INSTRUMENTS

FIELD OF THE INVENTION

The present invention generally relates to stringed instrument pickups, and more specifically to optically sensitive string vibration sensing apparatus.

BACKGROUND OF THE INVENTION

Electrical stringed instruments require that the string's vibrations be accurately detected and electrically transformed to ultimately produce audible sounds. Presently, the most common form of string transducer on electric guitars and basses is the magnetic "pickup."

Magnetic pickups on guitars date back to 1931. Although they are the dominant form of string vibration transducers on electric guitars today, magnetic pickups are not without disadvantages. Furthermore, because of string-bridge radius and mechanical mounting difficulties, magnetic pickups are limited to certain styles of electric guitars and are not practical for instruments such as violins, harps, and upright bases.

A magnetic pickup operates by generating a magnetic field which is interrupted by vibrations of a steel string. The disadvantages of a magnetic pickup include the problem that non-magnetic strings such as nylon strings cannot be used with a magnetic pickup.

The natural shape of a string's vibration on guitars, basses and other stringed instruments is an ellipse or oval pattern. The magnetic field of the pickup changes the sound and decreases the sustain of a string's vibration by pulling the vibration into a more vertical pattern. Accordingly, another disadvantage of magnetic pickups is that they affect the vibration mode of the string, and therefore the string's natural sound.

Magnetic pickups are primarily sensitive to only the vertical vibrations of a string, and not vibrations in the horizontal axis. This coupled with the effect that magnets have on a string's vibration, causes the string's natural sound to be undesirably "colored."

In cases where the magnet is too powerful or too close to the string, the magnet can produce unwanted harmonic overtones and may actually cause the string to buzz on the instrument's higher frets. Also, the magnetic pickup produces a nonlinear signal which adds further complications to those discussed above.

Most magnetic pickups use pole pieces to conduct magnetic flux up towards the string. Because there is a higher output signal when the string is close to the metal pole, the problems described above are even more pronounced. Furthermore, individual string vibration information cannot be channeled to discreet channels for low-noise conditioning circuitry.

Another type of pickup, the piezoelectric pickup, operates by inducing the dynamic mechanical stress of string vibration on a piezo-crystal. A potential difference appears on opposite ends of the crystal, generating a signal.

Its applications include sensors, microphones and pickups for stringed instruments, such as acoustic style guitars, violins and upright basses. The pickups may be conveniently retrofitted in the bridge of the instrument. Problems arise because the piezo-crystal output impedance is quite high, typically in the mega-ohms. Furthermore, piezoelectric pickups operate on mechanical losses which occur in string and bridge interfaces, therefore, their sound quality is limited.

Piezoelectric pickups have further disadvantages. For example, the response and performance are reduced due to the effect of the mechanical and electrical load on the output voltage. Moreover, the output voltage, which is also frequency dependent, increases with frequency causing the response to rise at higher frequencies. The sound quality is therefore only sufficient at high frequencies.

Optical transducers have been disclosed by Ferber, U.S. Pat. No. 3,733,954, issued May, 1973; by Siebeneiker et al., U.S. Pat. No. 4,563,391, issued January, 1986. The configurations disclosed therein have not been acceptable because of the great difficulty in alignment of the string and sensor during actual use.

Modern guitarists often "bend" strings, moving the string laterally across the fret board. Optical transducers of the prior art do not detect vibration of the strings in both vertical and horizontal axes. Additionally, prior optical transducers have been noisy due to ambient lights and thermal noise, among other reasons. Furthermore, prior optical transducers have not been easily retrofittable due to emitter, lens and sensor alignment problems.

OBJECTS AND SUMMARY OF THE INVENTION

It is therefore a general object of the present invention to provide a transducer which is representative of the stringed instrument's actual sound.

It is a specific object of the present invention to provide a transducer which has low noise and has high sensitivity.

It is an object of the present invention to provide a string vibration transducer which compensates for the effect that string extension or "bending" has on output sensitivity.

It also an object to provide a multi-axis string sensor which allows the full amount of string vibration for each string to be transduced into discreet electrical outputs which are received by low-noise conditioning circuitry.

It is a further object of the present invention to provide a transducer having linear output.

It is yet another object to provide a transducer with a wide frequency bandwidth.

It is a further object to provide a mechanism that allows for simple, accurate string and optical sensor alignment.

It is still another object of the present invention to provide a transducer which can be used on either metal or nylon strings.

It is yet a further object to provide a transducer which is modular and easily retrofittable to a stringed instrument.

The foregoing and other objects of the invention are achieved by a transducer apparatus having an array of supports for positioning an array of sensors which generate electrical analog output signals. The transducers have mounts with at least three sides, the first with a light source, the second and third with optical sensors. The optical sensors receive light simultaneously and generate an analog signal. Differential summing of the two optical sensors increases sensitivity, linearizes the output signal and provides a noise reduction means to reduce the noise of the final output. Furthermore, a piezoelectric pickup is combined with the optical transducer to provide a transducer apparatus with a wide frequency bandwidth.

Other objects and advantages of the invention will become apparent upon reading the following detailed description with reference to the drawings:

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENT

Reference will now be made in detail to the preferred embodiments of the invention. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the claims.

Figure 1:
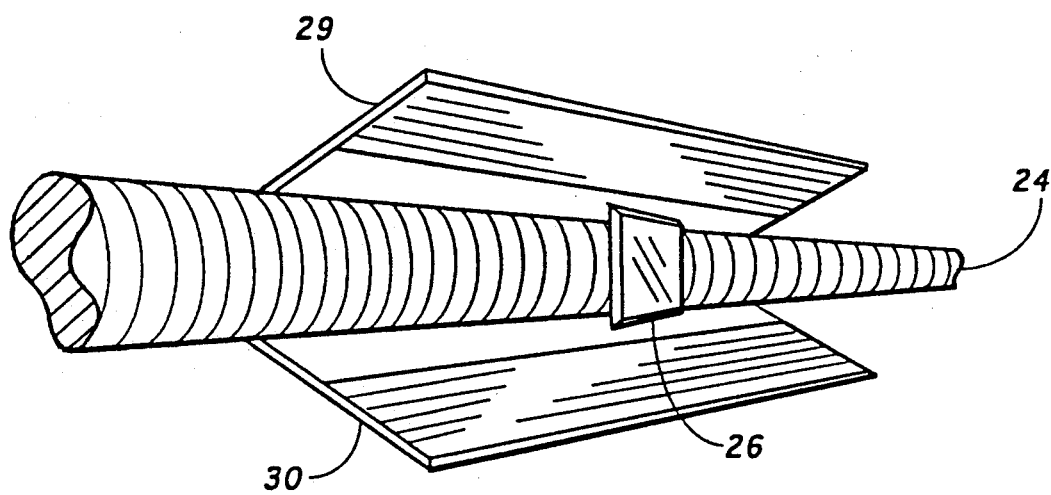
FIG. 1 is a perspective view of the sensor, string and light source configuration of the present invention.
Figure 2:
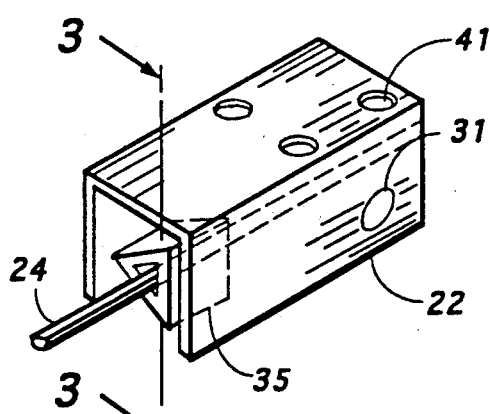
FIG. 2 is a perspective view of the optical transducer mounted in a retrofittable support/saddle.

Turning now to the drawings, wherein like components are designated by like reference numerals, attention is directed to FIG. 1 showing a divergent light source 26 and string 24 casting a shadow on optical sensors 29 and 30. FIG. 2 shows a transducer module of the present invention. The support 22 in the preferred embodiment has three walls which enclose the optical transducer 35, shielding ambient light from the sensors. Other configurations for the support can be envisioned, such as a piece molded around the transducer module. Any configuration for positioning the detectors is within the scope of the present invention.

Figure 3:
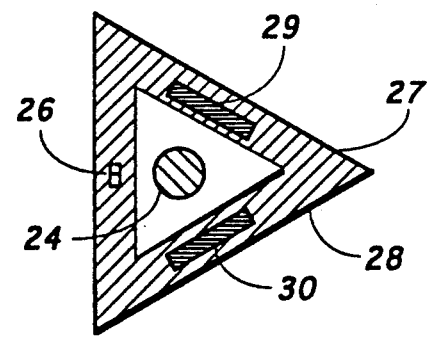
FIG. 3 is a front view of the optical transducer assembly of the present invention.

The optical transducer 35, is shown in more detail in FIG. 3. In the preferred embodiment, the optical transducer has at least three walls. The first wall 25, has a divergent light source 26, mounted so that the light projected from the light source shines in the direction of the other two walls 27 and 28, each having optical sensors 29 and 30. The light from light source 26, illuminates optical sensors 29 and 30 simultaneously so that when a string 24 vibrates, all motion of the string is detected. Furthermore, it is preferable that the optical sensors 29 and 30 are large enough so that the extreme positions of a string as it vibrates or as it is bent, are detected.

Figure 4:
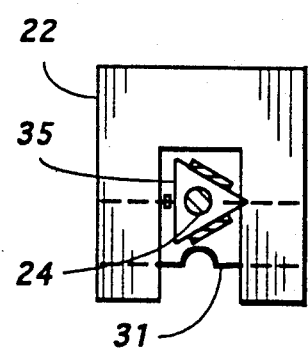
FIG. 4 is a front view of the present invention showing the optical transducer mounted in a retrofittable support/saddle.
Figure 5:
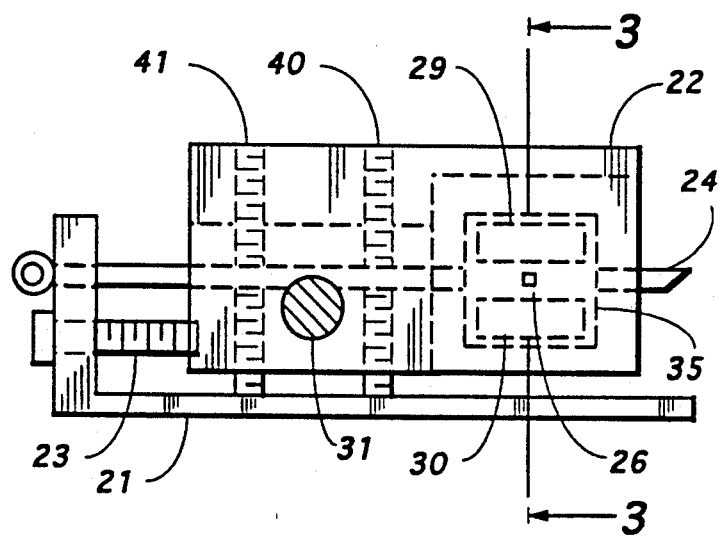
FIG. 5 is a side view of the present invention showing the transducer/support assembly mounted on an instrument's bridge plate.

The support 22 is configured to straddle a string 24, which rests on a saddle 31, as shown in the background of FIG. 4 and in the side view of FIG. 5. As the string vibrates in a circular or elliptical pattern, it is preferable that the light source 26, on first wall 25, cast shadows on both sensors during such movement so that the complete motion of the string 24, is detected. In other words, the present invention provides string vibration sensing for multiple axes of a string's vibration. Depending on the instrument a user chooses to use the present invention with the optical transducer module 35, may be oriented with wall 25, and light source 26, of the transducer module mounted perpendicular or parallel to the playing plane of the instrument (discussed in more detail below).

FIG. 5 shows a side view of the present invention mounted on an electric guitar bridge plate 21. Module supports 22, replace the instruments' original style string saddles. Screws 40 are for string height adjustment and screws 23 are for intonation adjustment. These are adjustment screws found on most electric guitar string saddles. Screw 41 is for azimuth adjustment of the module support and is unique to the present invention (discussed in more detail below).

Figure 6:
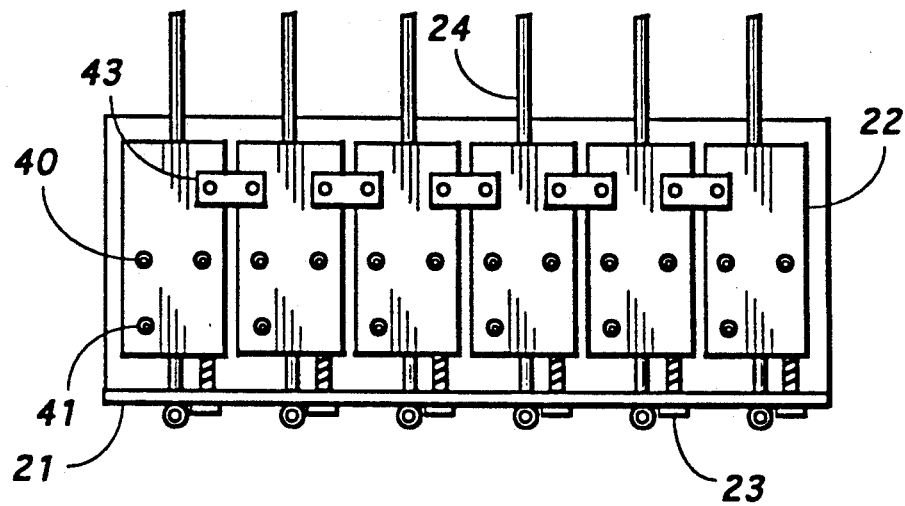
FIG. 6 is a top view of an array of transducer modules mounted on a guitar bridge plate.

FIG. 6 shows a top view of the module supports 22 attached to a bridge plate 21. Each support 22 contains an optical transducer module 35, each providing discrete vibration information for each string 24 of, for example, a guitar. By simply adding or subtracting modules, the user can easily configure the present invention for the type of instrument to be used. For example, six modules for guitar, four for bass, etc. For instruments without a bridge plate that use a "floating" bridge, such as acoustic guitars and violins, it may be desirable to simply use brackets 43, to hold individual modules together as an array. String tension holds the entire assembly against the instrument's body, in effect creating a floating bridge. Other modularity means may be envisioned, such as clamps of varying sizes which may hold together different sized arrays.

In addition to the array size and detector position customizing features discussed above, other customization features are provided in the preferred embodiment of the present invention. For example, signal magnitude and frequency range controls (not shown) are provided, the means for providing such controls are known in the art. These features provide the user with the ability to customize the sound produced by the present invention.

Figure 7:
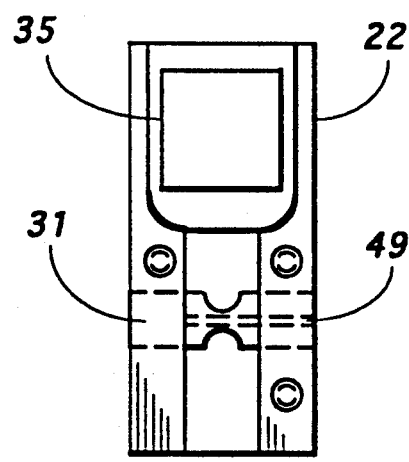
FIG. 7 is a bottom view of a transducer/support assembly showing the ;optical transducer module mounted in tandem with a piezoelectric pickup.

FIG. 7 shows a bottom view of a transducer module. Support 22 acts as a housing for optical transducer 35 and saddle 31. In the preferred embodiment of the present invention, saddle 31 may have a piezoelectric pickup 49 encapsulated inside. Piezoelectric transducers are typically built into the bridge to read the string vibration at the point where the string crosses the saddle. The piezoelectric transducer, in the preferred embodiment, is used in tandem with the optical transducer 35 so as to make contact with the string and read the vibration at the saddle 31. Furthermore, the system can be integrated electrically and mechanically into a transducer support 22, one element for each string of the instrument. The combination of the piezo transducer 49 and optical transducer 35 therefore forms a hybrid transducer unit which is modular and may be formed into an array which can be mounted on a guitar or other stringed instruments as shown in FIG. 6.

The combination of piezoelectric transducers with optical transducers provides richness of sound. The optical transducer, being the dominant component of the sound output of the system, is utilized for its flat response to the pure string vibration. It provides a powerful string sound, rich in harmonic content. The piezo pickup, which is a velocity sensitive device, is utilized to read mechanical stress at the point where the string contacts the saddle. The output of the piezo transducer is filtered to remove low and/or the mid-range components of its sound, and therefore, its high range is blended into the optical output. The combination of the two sounds provides an overall response that is favorable to string musicians who employ certain playing techniques which require snappy, percussive response.

Figure 8:
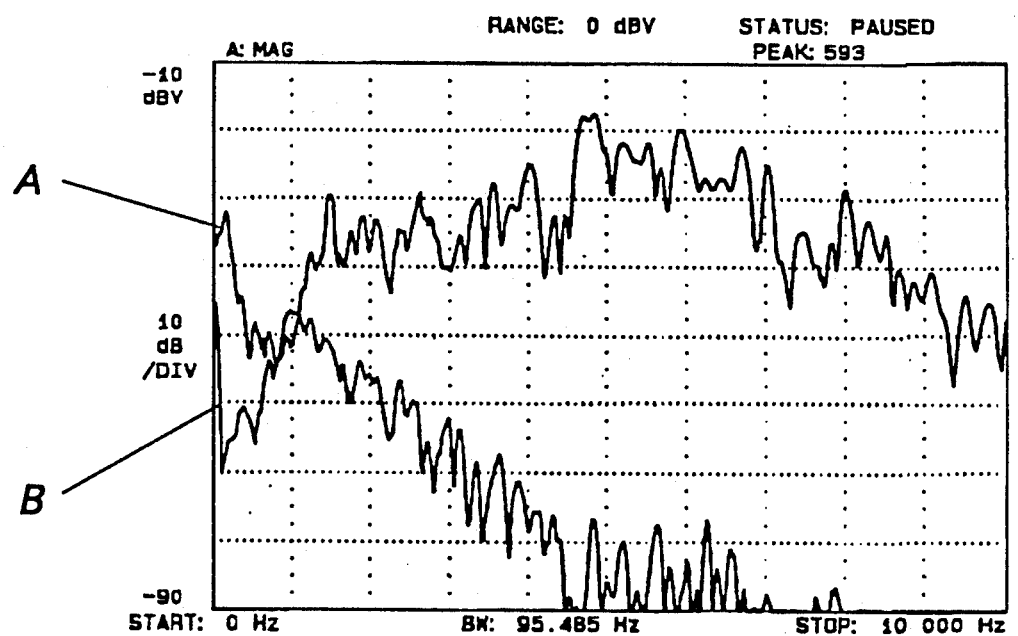
FIG. 8 is a graph showing the examples of frequency responses of an optical transducer and piezo pickup of the present invention.

The output of the piezo portion of the audio signal is buffered, filtered and then routed through a potentiometer so that it is blended with the optical output in varying ratios. For the present invention, the circuit should not allow the utilization of the output of the piezo transducer separately, but only as a complement to the optical output. The benefit of the hybrid transducer unit is shown in FIG. 8. The graph shows the frequency response of both an optical transducer A and a piezo transducer B. The combination provides a crossover full range frequency response.

Figure 9:
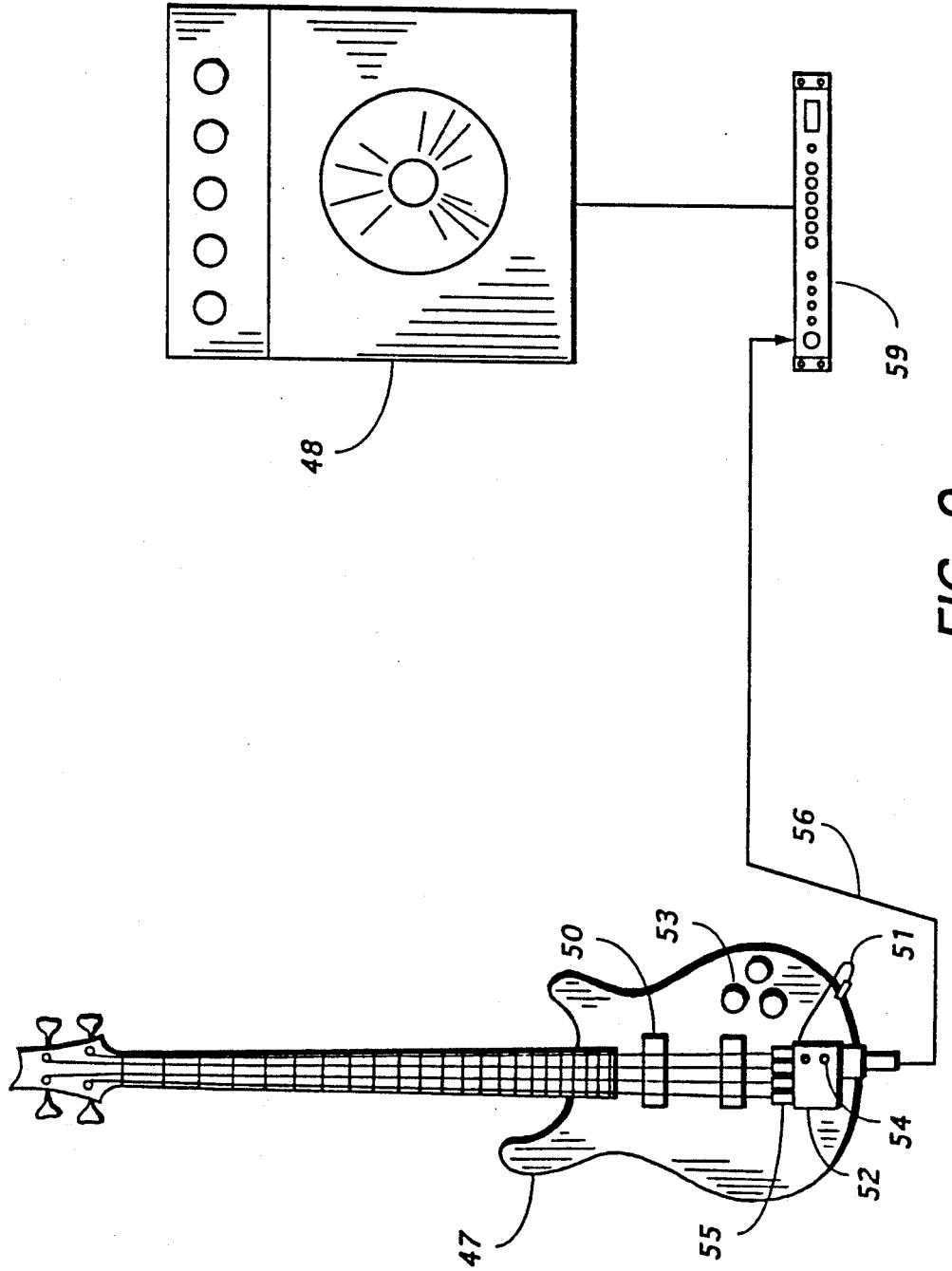
FIG. 9 is a diagram showing a transducer array of the present invention mounted in the bridge position of a guitar including guitar electronics.

FIG. 9 shows the present invention mounted on an electric guitar 47. Other stringed instruments may be used with the present invention in a similar manner, with an array of transducer modules 55 mounted in the bridge position.

The electric guitar 47 may also be equipped with magnetic pickups 50. In the case of instruments such as the electric guitar, the guitar's electronics need not be made obsolete by attaching this device.

The output cord 51 which normally runs to an amplifier 48 is instead connected to this invention's support electronics 52 which may be outboard, attached to the guitar, or mounted internally. The guitar's magnetic pickup control 53 may still be used and switched on or off by the support electronics control 39. The support electronics 52 are connected to the photoelectric transducer array 55 of the present invention, giving the player a choice of using magnetic pickups, photoelectric transducers or a mix of both.

From the support electronics runs cord 56 to the power supply 59. The power supply may be used to connect a summed signal from the separate photoelectric string sensors to one amplifier, or discrete signals to multiple amplifiers; one for each string. The advantage for the player is that no sacrifice of previous electronics is required, the use of individual string sensing modules positioned within support 22 allow discrete amplification for each.

Figure 10:
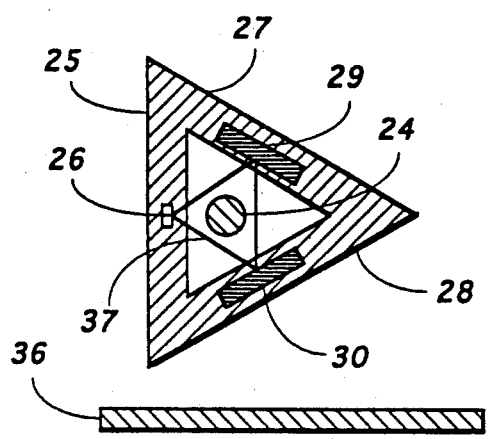
FIG. 10 is a front view of an optical transducer showing the relationship between transducer, string and instrument fretboard.

The principles of operation of the present invention are explained in conjunction with FIGS. 10-17. FIG. 10 is a front view of the optical transducer module 35 for guitars, having three walls 25, 27 and 28. Wall 25, containing light source 26, is oriented perpendicular to the instrument fretboard plane 36. Sensors 29 and 30 are bisected laterally by light source 26 and string 24. String 24 is offset from a line 37 to sensors 29 and 30 defining the shortest distance from the light source 26 to the sensors 29 and 30.

Figure 11:
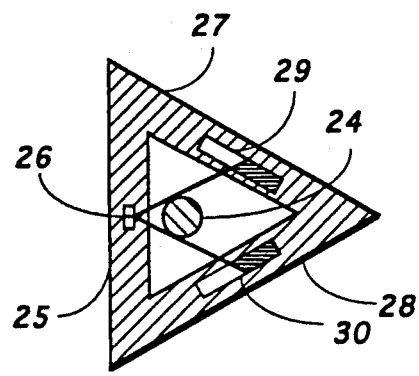
FIG. 11 is a front view of the present invention showing the optical transducer and string in the rest position.

FIG. 11 shows the umbra created by light source 26 and string 24 on sensors 29 and 30 when string 24 is at rest. The divergent nature of light source 26 illuminates the entire interior of optical transducer 35 except for areas blocked by string 24. Note that both sensors are shared equally when the string 24 is at its rest position. When string 24 is plucked, it vibrates in an elliptical or circular pattern about its axis. This in turn causes a change in umbra size on each sensor.

Figure 12:
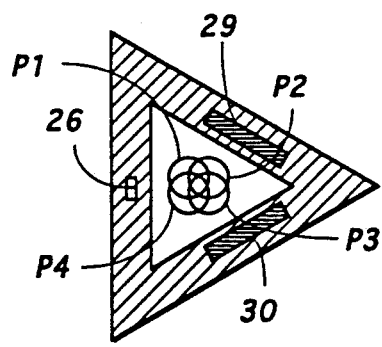
FIG. 12 is a front view of the optical transducer showing the vibrational mode of a string inside the transducer.

FIG. 12 shows the vibrational mode of string 24. P1, P2, P3 and P4 are various string positions during the vibrational mode. As the string vibrates about its axis, the distance from string 24 to light source 26 increases or decreases, effecting a change in umbra size on sensors 29 and 30. For example, if the string is in position P1, it has moved to a position closer to a line defining the shortest distance between light source 24 and sensor 29. This increases the umbra size on sensor 29. Position P1 is also further away from a line defining the shortest distance between light source 26 and sensor 30. This decreases the size of umbra cast on sensor 30.

Figure 13A:
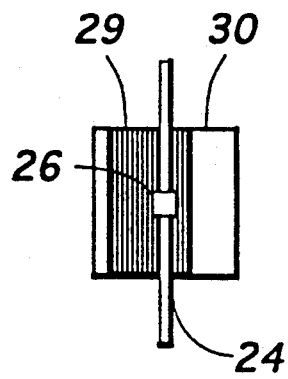
FIG. 13a-d show the umbra as cast upon the sensors of the present invention when the string is in vibrational mode.
Figure 13B:
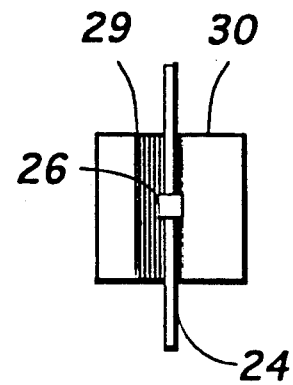
Figure 13C:
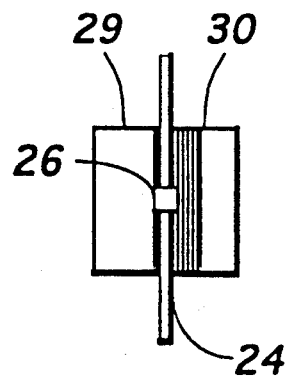
Figure 13D:
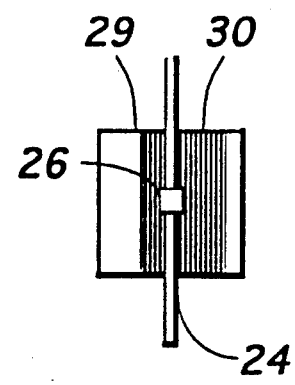

FIG. 13a shows the umbra detected by sensors 29 and 30 when string 24 is in position P1. Positions P2, P3 and P4 are represented in FIGS. 13b, 13c and 13d, respectively. Note that the umbra size in FIGS. 13a, 13b, 13c and 13d all show a difference between sensors 29 and 30, and at no time does the umbra completely leave the sensors 29 and 30 and operate in a "chopping" mode. It is this change in umbra size that corresponds with string vibration and in turn produces the corresponding electrical analog output signals.

Figure 20:
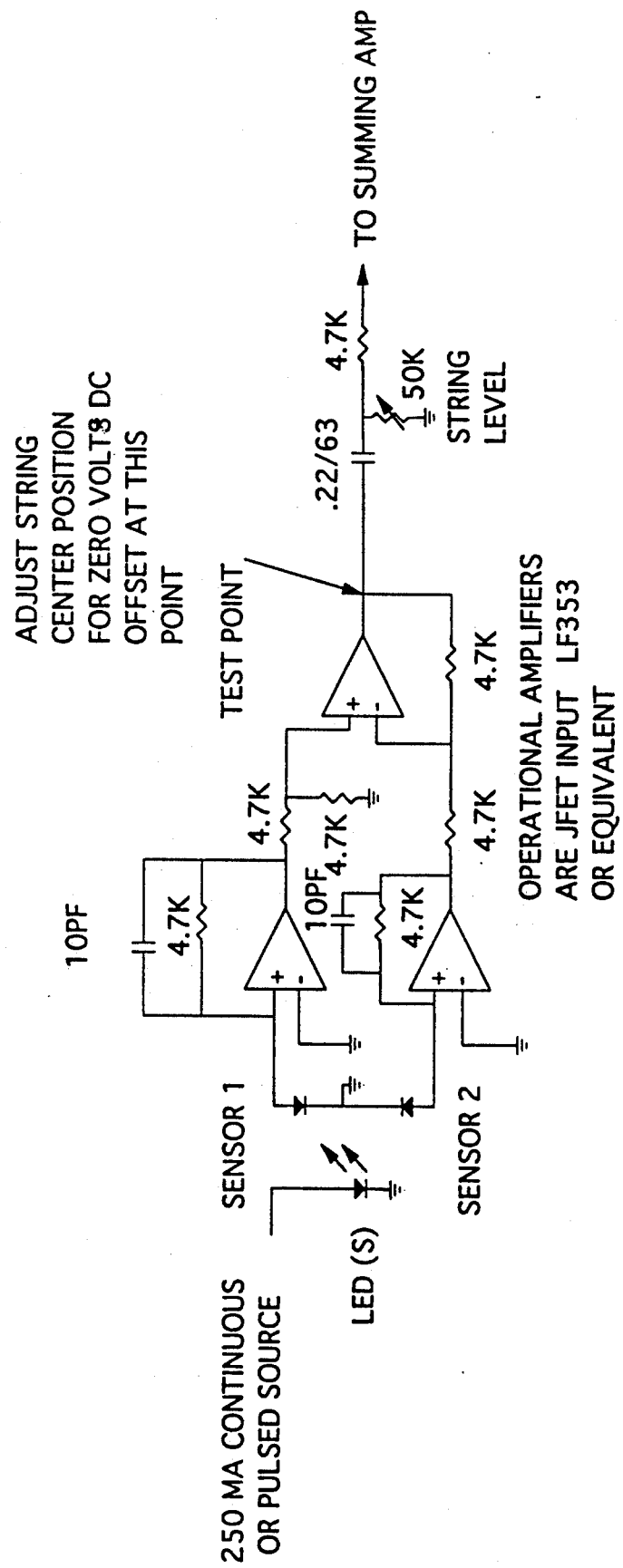
FIG. 20 is a circuit diagram of the preferred differential noise reduction means of the present invention.

Sensors 29 and 30 are operated by a differential amplifier and the outputs of the sensors are subtracted to provide a signal as shown in FIG. 20 by differential input stage. Noise reducing means are known in the art, therefore any switchable differential noise reduction means are within the scope of the present invention.

Accordingly, any string position that creates a shadow size difference between sensors 29 and 30 will generate a signal. Another advantage of differential amplification is that any stray ambient light will be canceled out, and will not introduce unwanted noise in the system.

Figure 14:
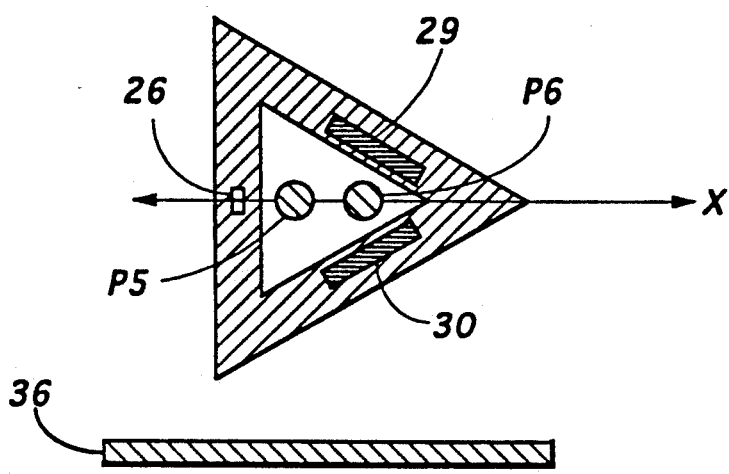
FIG. 14 shows a front view of an optical transducer showing string excursion when a string is bent.
Figures 15A, 15B:
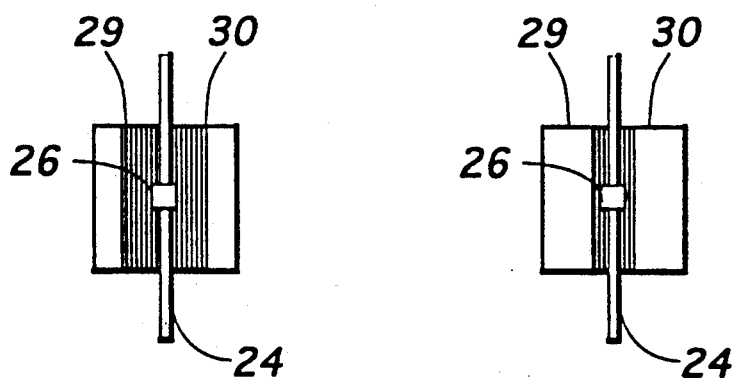
FIG. 15a and 15b show the umbra as cast upon the sensors of the present invention as the string is bent.

Most guitarists change pitch when playing a note by bending the string. String travel is much greater for bending than for vibration. FIG. 14 shows this string excursion when a player bends a string. P5 shows a string in its unbent or normal position and P6 corresponds to a fully bent position. The vibrational displacement of string 24 at the optical transducer position is less than 0.25, the diameter of string 24, while the amount of travel in the fretboard axis X, when the string is fully bent in position P6, is up to three or four times the diameter of the string. Because light source 26, string 24, and sensors 29 and 30 are aligned parallel to fretboard axis X, at no time does the strings' umbra leave sensors 29 and 30. Instead, the umbra remains equal on sensors 29 and 30, as it moves from position P5 to position P6. FIGS. 15a and 15b show this relationship with the string position P5 corresponding to FIG. 15a and string position P6 corresponding to FIG. 15b. As can be seen, the umbra size decreases from position P5 to position P6, but remains equal between sensors 29 and 30. The differential circuit cancels out this common mode signal along the narrow axis parallel to the fretboard 36. Therefor, there is no decrease in output for string bending, only the elliptical vibrational mode is detected.

Figure 16:
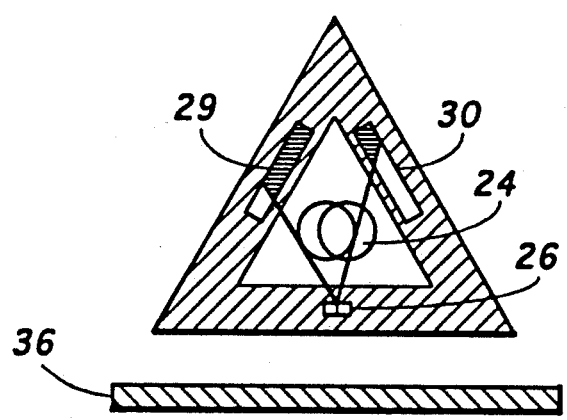
FIG. 16 is a front view of an optical transducer oriented for bowed instruments.

FIG. 16 shows the optical transducer position for instruments that are primarily sensitive to vibrations parallel to the fretboard axis, such as bowed instruments, (violins, cello, etc.). Light source 26 is positioned between the fretboard 36 and string 24. When the string 24 is bowed in axis X, sensors 29 and 30 detect a difference in shadow size with respect to each other, and a signal is generated.

Figure 17:
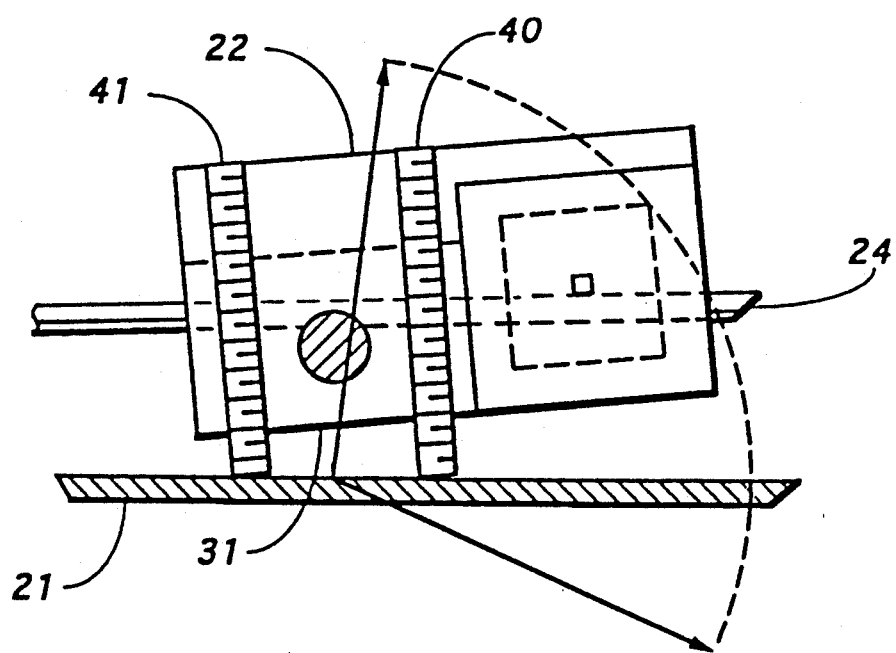
FIG. 17 is a side view of the present invention showing the mechanism for aligning the string and optical transducer.
Figure 18:
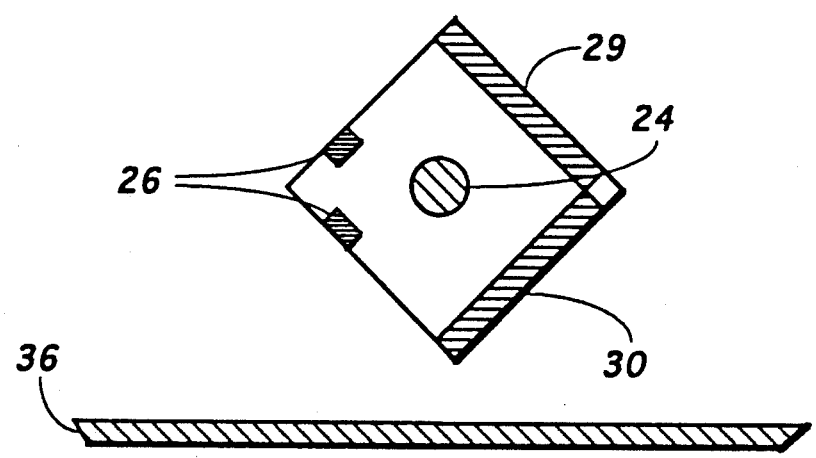
FIG. 18 is a four sided version of the optical transducer of the present invention.

FIG. 17 shows a side view of a transducer module for electric guitars and basses. The light source 26, is located on a plane perpendicular to the fretboard 36. String height adjustment screws 40 are used to adjust the playing action of individual strings, a universal feature on contemporary electric guitars and basses. In order to allow the player precise alignment of the string 24 and optical transducer 35, the present invention has an extra azimuth adjustment screw 41, which allows simple and accurate alignment. After the string height has been adjusted by the height adjustment screws 40, the azimuth screw 41 is used for final adjustment. The support 22, is pivoted on string height adjustment screws 40, thereby bringing string 24 into alignment with light source 26 as shown in FIG. 18. This alignment is noted by the input stage circuitry when the DC offset for both sensors 29 and 30, is zero. This nulling of the sensors is noted by the musician when an indicator such as a L.E.D. turns on or off as shown in the circuit diagram in FIG. 20.

FIG. 18 shows a four sided phototransducer with an extra light source 26. Certain instruments, such as guitars that have vibrato mechanisms built into the bridge, exhibit large amounts string displacement in the vertical axis Z. To allow for extra movement in this axis, it may be desirable to use the configuration shown in FIG. 18. The operation of the device is the same as the configuration in FIG. 14 because the string 24 is still offset from a line defining the shortest distance from light source 26 to sensors 29 and 30.

Figure 19:
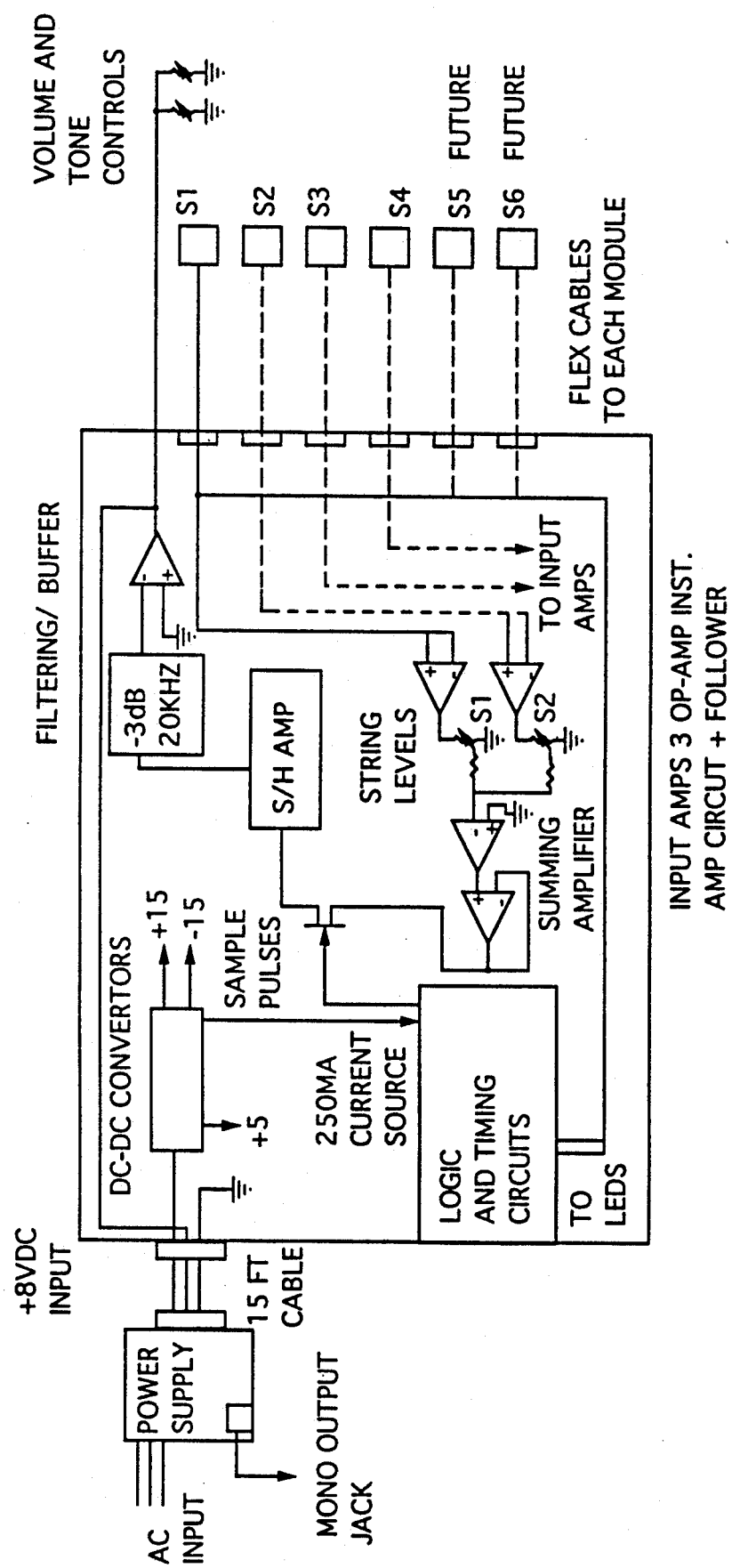
FIG. 19 is a circuit diagram for converting the output of the sensor to an electrical analog signal.

The electronics used for converting the output signal of a sensor to an electrical analog output signal are shown in FIGS. 19 and 20. As shown in FIG. 19, the circuitry is configured to effect current amplification, AC coupling and low pass filtering. The output sensors 29 and 30 are subtracted using a conventional differential amplifier as shown in FIG. 20 to provide a signal which is indicative of the actual amplification and frequency of the string vibration. In this manner, a multi-axis sensor is provided which is low noise in nature because the use of two or more sensors per string operated in a differential mode cancels out the noise. Any noise generated in both sensors will be eliminated. Such noise would include ambient light hitting the sensors and AC noise in the sensors among other sources.

Figure 21:
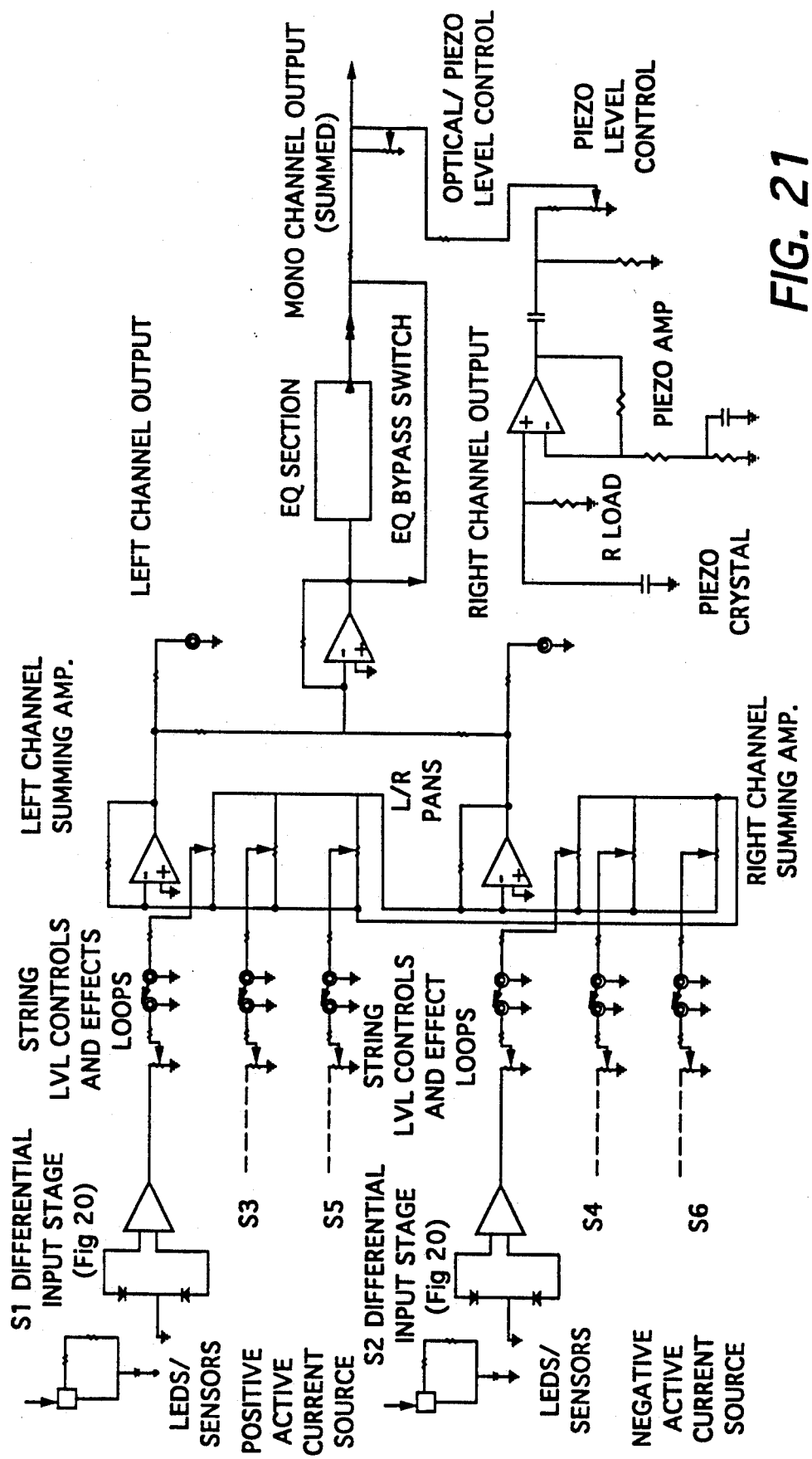
FIG. 21 is a circuit diagram for providing either stereo summing or mono summing of individual string outputs.

FIG. 21 shows a circuit diagram which provides for stereo output, that is summing half of the strings for a first channel's output and half of the strings for a second channel's output. Also shown in the circuit diagram for providing a mono output of all strings summed.

In the present invention, the light sources are divergent sources and preferably exhibit a degree of collimation to effect a change in umbra size. Light sources include light emitting diodes (L.E.D.), incandescent sources, fiber optics, among others. The light source is also, preferably infrared. Furthermore, the light source is not limited to a single light source, but can also be an array of light sources. The sensors of the present invention also include fiber optic collectors.

The size of the detector may also vary with respect to the string for which it is intended. For example, the string 1 of a guitar has a diameter of 0.050 cm and the detector 29 may have walls of length 0.160 cm, therefore the string to wall ratio is 3.2. The detector 29 for string 2 having a diameter of 0.060 cm may have walls of length 0.160 cm, therefore the string to wall ratio is 2.66. Furthermore, the detector 29 for string 3 having a diameter of 0.080 cm may have walls of length 250 cm, therefore the string to wall ratio is 3.125, and so on. The sensor size varies proportionately. The purpose of changing the dimensions of the detector with respect to the string size is to provide the assurance that the extremes of the string vibrations are accurately detected.

It is clear that the general object of the present invention to provide a pickup which it representative of the stringed instrument's actual sound has been met. The object of the present invention to provide a pickup which has low noise and has high sensitivity has also been met as has the object of the present invention to provide a string vibration sensor which compensates for the effect string excursion or "bending" has on output sensitivity. Moreover, the object to provide a multi-axis string sensor which allows the full amount of string vibration for each string to be transduced into discreet electrical outputs which are received by low-noise conditioning circuitry has been met. Also, the object of the present invention to provide a pick-up having linear output has been met. Furthermore, the object of the present invention to provide a transducer with a wide frequency bandwidth. Finally, the object of the present invention to provide a pickup which can be used on either metal or nylon strings has been achieved as has the object to provide a pickup which is modular and easily retrofittable to a stringed instrument.

While the invention has been shown and described in what is presently conceived to be the most practical and preferred embodiment of the invention, it will become apparent to those of ordinary skill in the art that many modifications thereof may be within the scope of the invention, which scope is to be accorded the broadest interpretation of the claims so as to encompass all equivalent structures and devices.

We claim:

1. A pick-up apparatus for stringed instruments having strings which vibrate, comprising:
   an array of supports for positioning an array of detectors which monitor said string's vibrations and generates electrical output signals, each of said supports for straddling a string of said stringed instrument, each of said detectors comprising:
   (a) a sensor mount having first, second and third walls such that a string at rest can be positioned approximately along its axis;
   (b) a divergent light source mounted on said first wall of said sensor mount;
   (c) a first optical sensor capable of detecting light, said first sensor mounted on said second wall of said sensor mount;
   (d) a second optical sensor capable of detecting light, said second sensor mounted on said third wall of said sensor mount; and
   wherein said first optical sensor and said second optical sensor receive light simultaneously from said light source when said light source is illuminated and generates an electrical analog output signal.

2. An apparatus as recited in claim 1 further comprising a differential noise reduction means for reducing noise of said output.

3. An apparatus as recited in claim 1 wherein said first, second and third walls are positioned in a triangular configuration.

4. An apparatus as recited in claim 1 further comprising a fourth wall and a light source mounted on said fourth wall.

5. An apparatus as recited in claim 1 wherein said first wall of said light source is approximately perpendicular to the plane of said instrument's playing surface.

6. An apparatus as recited in claim 1 wherein the magnitude of each of said detectors' outputs is individually controllable.

7. An apparatus as recited in claim 1 wherein the frequency range of each of said detectors' output is individually controllable.

8. An apparatus as recited in claim 1 wherein said first wall of said light source is approximately horizontal to the plane of said instrument's playing surface.

9. An apparatus as recited in claim 1 wherein said array of supports include modularity means for assembly and disassembly of said array of supports.

10. An apparatus as recited in claim 1 wherein said light source is infrared.

11. An apparatus as recited in claim 1 wherein said light source is a light emitting diode.

12. An apparatus as recited in claim 1 wherein said light source is an incandescent source.

13. An apparatus as recited in claim 1 wherein said light source is a fiber optic source.

14. An apparatus as recited in claim 1 wherein said sensor is a photoresistor.

15. An apparatus as recited in claim 1 wherein said support further comprises means for shielding ambient light from said optical sensors.

16. A stringed instrument pick-up apparatus for a stringed instrument which produces high range, mid-range and low range output frequency components, comprising:
   (1) an optical transducer to receive said stringed instrument's output and generate an analog electrical output signal comprising:
   (a) a sensor mount having first, second and third walls in a triangular configuration such that a string of said stringed instrument can be positioned approximately along its axis;
   (b) a divergent light source mounted on said first wall of said sensor mount;
   (c) a first optical sensor capable of detecting light, said first sensor mounted on said second wall of said sensor mount;
   (d) a second optical sensor capable of detecting light, said second sensor mounted on said third wall of said sensor mount; and
   (2) a piezoelectric transducer positioned to receive said stringed instrument's output and generate an electrical output signal.

17. An apparatus as recited in claim 16 wherein said piezoelectric transducer comprises low range filter means for filtering out said low frequency components received from said instrument's output such that said piezoelectric transducer's output does not include low range frequency components.

18. An apparatus as recited in claim 16 wherein said piezoelectric transducer further comprises mid-range filter means for filtering out said mid-range frequency components received from said instrument's output such that said piezoelectric transducer's output does not include mid-range frequency components.

19. An apparatus as recited in claim 16 wherein said first wall of said light source is approximately perpendicular to the plane of said instrument's playing surface.

20. An apparatus as recited in claim 16 wherein the magnitude of each of said detectors' outputs is individually controllable.

21. An apparatus as recited in claim 16 wherein the frequency range of each of said detectors' output is individually controllable.

22. An apparatus as recited in claim 16 wherein said first wall of said light source is approximately horizontal to the plane of said instrument's playing surface.

23. An apparatus as recited in claim 16 wherein said array of supports include modularity means for assembly and disassembly of said array of supports.

24. An apparatus as recited in claim 16 wherein said light source is infrared.

25. An apparatus as recited in claim 16 wherein said light source is a light emitting diode.

26. An apparatus as recited in claim 16 wherein said light source is an incandescent source.

27. An apparatus as recited in claim 16 wherein said light source is a fiber optic source.

28. An apparatus as recited in claim 16 wherein said sensor is a photoresistor.

29. An apparatus as recited in claim 16 wherein the optical transducer and string are alignable with a mechanism that pivots the assembly into proper alignment by means of an azimuth adjustment screw.

* * * * *